United States Patent
Russo (10) Patent No.: US 8,929,619 B2
(45) Date of Patent: Jan. 6, 2015

(54) SYSTEM AND METHOD OF IMAGE RECONSTRUCTION WITH DUAL LINE SCANNER USING LINE COUNTS

(71) Applicant: Synaptics Incorporated, San Jose, CA (US)

(72) Inventor: Anthony P Russo, New York, NY (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 14/088,661

(22) Filed: Nov. 25, 2013

(65) Prior Publication Data

US 2014/0072187 A1 Mar. 13, 2014

Related U.S. Application Data

(63) Continuation of application No. 13/014,389, filed on Jan. 26, 2011, now Pat. No. 8,594,393.

(51) Int. Cl.
*G06K 9/00* (2006.01)

(52) U.S. Cl.
CPC .................... *G06K 9/00026* (2013.01)
USPC ........................................ 382/124

(58) Field of Classification Search
None
See application file for complete search history.

(56) References Cited

U.S. PATENT DOCUMENTS

| | | |
|---|---|---|
| 3,593,319 A | 7/1971 | Barber |
| 4,151,512 A | 4/1979 | Riganati et al. |
| 4,225,850 A | 9/1980 | Chang et al. |
| 4,310,827 A | 1/1982 | Asi |
| 4,353,056 A | 10/1982 | Tsikos |
| 4,405,829 A | 9/1983 | Rivest et al. |
| 4,525,859 A | 6/1985 | Bowles et al. |
| 4,550,221 A | 10/1985 | Mabusth |
| 4,580,790 A | 4/1986 | Doose |
| 4,582,985 A | 4/1986 | Lofberg |
| 4,675,544 A | 6/1987 | Schrenk |

(Continued)

FOREIGN PATENT DOCUMENTS

| | | |
|---|---|---|
| DE | 2213813 A1 | 10/1973 |
| EP | 0791899 A2 | 8/1997 |

(Continued)

OTHER PUBLICATIONS

Matsumoto et al., Impact of Artificial "Gummy" Fingers on Fingerprint Systems, SPIE 4677 (2002), reprinted from cryptome.org.

(Continued)

*Primary Examiner* — Vikkram Bali
(74) *Attorney, Agent, or Firm* — Leydig, Voit & Mayer, Ltd.

(57) ABSTRACT

A fingerprint scanning and image reconstruction system and method including a fingerprint scanner providing a first scan line and a second scan line separated by a line separation distance in a scanning direction. The system includes an image reconstruction module accumulating scan lines including at least the first scan line and the second scan line over a time period t. The image reconstruction module a value for decimation (t) necessary to produce a selected y axis resolution in the scanning direction based at least in part on (line count(t)/line separation distance)*a selected y resolution, where line count(t) is the number of lines accumulated in time t, and decimation(t) indicates of whether the line count(t) is greater than or less than the number of lines accumulated as a function of the time period t that will result in a selected reconstructed image y resolution in the scanning direction.

17 Claims, 3 Drawing Sheets

(56) References Cited

U.S. PATENT DOCUMENTS

| | | |
|---|---|---|
| 4,758,622 A | 7/1988 | Gosselin |
| 4,817,183 A | 3/1989 | Sparrow |
| 5,076,566 A | 12/1991 | Kriegel |
| 5,079,949 A | 1/1992 | Tamori |
| 5,109,427 A | 4/1992 | Yang |
| 5,140,642 A | 8/1992 | Hsu et al. |
| 5,270,949 A | 12/1993 | Atherton et al. |
| 5,305,017 A | 4/1994 | Gerpheide |
| 5,319,323 A | 6/1994 | Fong |
| 5,325,442 A | 6/1994 | Knapp |
| 5,359,243 A | 10/1994 | Norman |
| 5,420,936 A | 5/1995 | Fitzpatrick et al. |
| 5,422,807 A | 6/1995 | Mitra et al. |
| 5,429,006 A | 7/1995 | Tamori |
| 5,456,256 A | 10/1995 | Schneider et al. |
| 5,515,738 A | 5/1996 | Tamori |
| 5,543,591 A | 8/1996 | Gillespie et al. |
| 5,569,901 A | 10/1996 | Bridgelall et al. |
| 5,623,552 A | 4/1997 | Lane |
| 5,627,316 A | 5/1997 | De Winter et al. |
| 5,650,842 A | 7/1997 | Maase et al. |
| 5,717,777 A | 2/1998 | Wong et al. |
| 5,781,651 A | 7/1998 | Hsiao et al. |
| 5,801,681 A | 9/1998 | Sayag |
| 5,818,956 A | 10/1998 | Tuli |
| 5,828,773 A | 10/1998 | Setlak et al. |
| 5,838,306 A | 11/1998 | O'Connor et al. |
| 5,844,287 A | 12/1998 | Hassan et al. |
| 5,848,176 A | 12/1998 | Hara et al. |
| 5,850,450 A | 12/1998 | Schweitzer et al. |
| 5,852,670 A | 12/1998 | Setlak et al. |
| 5,864,296 A | 1/1999 | Upton |
| 5,887,343 A | 3/1999 | Salatino et al. |
| 5,892,824 A | 4/1999 | Beatson et al. |
| 5,903,225 A | 5/1999 | Schmitt et al. |
| 5,915,757 A | 6/1999 | Tsuyama et al. |
| 5,920,384 A | 7/1999 | Borza |
| 5,920,640 A | 7/1999 | Salatino et al. |
| 5,940,526 A | 8/1999 | Setlak et al. |
| 5,963,679 A | 10/1999 | Setlak |
| 5,995,630 A | 11/1999 | Borza |
| 5,999,637 A | 12/1999 | Toyoda et al. |
| 6,002,389 A | 12/1999 | Kasser |
| 6,002,815 A | 12/1999 | Immega et al. |
| 6,011,859 A | 1/2000 | Kalnitsky et al. |
| 6,016,355 A | 1/2000 | Dickinson et al. |
| 6,052,475 A | 4/2000 | Upton |
| 6,067,368 A | 5/2000 | Setlak et al. |
| 6,073,343 A | 6/2000 | Petrick et al. |
| 6,076,566 A | 6/2000 | Lowe |
| 6,088,585 A | 7/2000 | Schmitt et al. |
| 6,098,175 A | 8/2000 | Lee |
| 6,118,318 A | 9/2000 | Fifield et al. |
| 6,134,340 A | 10/2000 | Hsu et al. |
| 6,157,722 A | 12/2000 | Lerner et al. |
| 6,161,213 A | 12/2000 | Lofstrom |
| 6,175,407 B1 | 1/2001 | Santor |
| 6,182,076 B1 | 1/2001 | Yu et al. |
| 6,182,892 B1 | 2/2001 | Angelo et al. |
| 6,185,318 B1 | 2/2001 | Jain et al. |
| 6,234,031 B1 | 5/2001 | Suga |
| 6,241,288 B1 | 6/2001 | Bergenek et al. |
| 6,256,022 B1 | 7/2001 | Manaresi et al. |
| 6,259,108 B1 | 7/2001 | Antonelli et al. |
| 6,289,114 B1 | 9/2001 | Mainguet |
| 6,292,173 B1 | 9/2001 | Rambaldi et al. |
| 6,292,272 B1 | 9/2001 | Okauchi et al. |
| 6,317,508 B1 | 11/2001 | Kramer et al. |
| 6,320,394 B1 | 11/2001 | Tartagni |
| 6,325,285 B1 | 12/2001 | Baratelli |
| 6,327,376 B1 | 12/2001 | Harkin |
| 6,330,345 B1 | 12/2001 | Russo et al. |
| 6,332,193 B1 | 12/2001 | Glass et al. |
| 6,333,989 B1 | 12/2001 | Borza |
| 6,337,919 B1 | 1/2002 | Duton |
| 6,343,162 B1 | 1/2002 | Saito et al. |
| 6,346,739 B1 | 2/2002 | Lepert et al. |
| 6,347,040 B1 | 2/2002 | Fries et al. |
| 6,357,663 B1 | 3/2002 | Takahashi et al. |
| 6,360,004 B1 | 3/2002 | Akizuki |
| 6,362,633 B1 | 3/2002 | Tartagni |
| 6,392,636 B1 | 5/2002 | Ferrari et al. |
| 6,399,994 B2 | 6/2002 | Shobu |
| 6,400,836 B2 | 6/2002 | Senior |
| 6,408,087 B1 | 6/2002 | Kramer |
| 6,459,804 B2 | 10/2002 | Mainguet |
| 6,473,072 B1 | 10/2002 | Comiskey et al. |
| 6,481,294 B2 | 11/2002 | Zellner et al. |
| 6,509,501 B2 | 1/2003 | Eicken et al. |
| 6,512,381 B2 | 1/2003 | Kramer |
| 6,525,547 B2 | 2/2003 | Hayes |
| 6,525,932 B1 | 2/2003 | Ohnishi et al. |
| 6,535,622 B1 | 3/2003 | Russo et al. |
| 6,539,101 B1 | 3/2003 | Black |
| 6,546,122 B1 | 4/2003 | Russo |
| 6,580,816 B2 | 6/2003 | Kramer et al. |
| 6,597,289 B2 | 7/2003 | Sabatini |
| 6,628,812 B1 | 9/2003 | Setlak et al. |
| 6,631,201 B1 | 10/2003 | Dickinson et al. |
| 6,643,389 B1 | 11/2003 | Raynal et al. |
| 6,672,174 B2 | 1/2004 | Deconde et al. |
| 6,710,461 B2 | 3/2004 | Chou et al. |
| 6,738,050 B2 | 5/2004 | Comiskey et al. |
| 6,741,729 B2 | 5/2004 | Bjorn et al. |
| 6,757,002 B1 | 6/2004 | Oross et al. |
| 6,766,040 B1 | 7/2004 | Catalano et al. |
| 6,785,407 B1 | 8/2004 | Tschudi et al. |
| 6,799,275 B1 | 9/2004 | Bjorn et al. |
| 6,836,230 B2 | 12/2004 | Le Pailleur et al. |
| 6,838,905 B1 | 1/2005 | Doyle |
| 6,862,942 B2 | 3/2005 | Kawahata |
| 6,873,356 B1 | 3/2005 | Kanbe et al. |
| 6,886,104 B1 | 4/2005 | McClurg et al. |
| 6,897,002 B2 | 5/2005 | Teraoka et al. |
| 6,898,299 B1 | 5/2005 | Brooks |
| 6,924,496 B2 | 8/2005 | Manansala |
| 6,937,748 B1 | 8/2005 | Schneider et al. |
| 6,941,001 B1 | 9/2005 | Bolle et al. |
| 6,941,810 B2 | 9/2005 | Okada |
| 6,950,540 B2 | 9/2005 | Higuchi |
| 6,959,874 B2 | 11/2005 | Bardwell |
| 6,963,626 B1 | 11/2005 | Shaeffer et al. |
| 6,970,584 B2 | 11/2005 | O'Gorman et al. |
| 6,980,672 B2 | 12/2005 | Saito et al. |
| 6,983,882 B2 | 1/2006 | Cassone |
| 7,013,030 B2 | 3/2006 | Wong et al. |
| 7,020,591 B1 | 3/2006 | Wei et al. |
| 7,030,860 B1 | 4/2006 | Hsu et al. |
| 7,031,670 B2 | 4/2006 | May |
| 7,035,443 B2 | 4/2006 | Wong |
| 7,042,535 B2 | 5/2006 | Katoh et al. |
| 7,043,061 B2 | 5/2006 | Hamid et al. |
| 7,043,644 B2 | 5/2006 | DeBruine |
| 7,046,230 B2 | 5/2006 | Zadesky et al. |
| 7,064,743 B2 | 6/2006 | Nishikawa |
| 7,099,496 B2 | 8/2006 | Benkley |
| 7,110,574 B2 | 9/2006 | Haruki et al. |
| 7,110,577 B1 | 9/2006 | Tschud |
| 7,113,622 B2 | 9/2006 | Hamid |
| 7,126,389 B1 | 10/2006 | McRae et al. |
| 7,129,926 B2 | 10/2006 | Mathiassen et al. |
| 7,136,514 B1 | 11/2006 | Wong |
| 7,146,024 B2 | 12/2006 | Benkley |
| 7,146,026 B2 | 12/2006 | Russon et al. |
| 7,146,029 B2 | 12/2006 | Manansala |
| 7,184,581 B2 | 2/2007 | Johansen et al. |
| 7,190,209 B2 | 3/2007 | Kang et al. |
| 7,190,816 B2 | 3/2007 | Mitsuyu et al. |
| 7,194,392 B2 | 3/2007 | Tuken et al. |
| 7,197,168 B2 | 3/2007 | Russo |
| 7,200,250 B2 | 4/2007 | Chou |
| 7,251,351 B2 | 7/2007 | Mathiassen et al. |
| 7,258,279 B2 | 8/2007 | Schneider et al. |
| 7,260,246 B2 | 8/2007 | Fujii |

(56) References Cited

U.S. PATENT DOCUMENTS

| | | |
|---|---|---|
| 7,263,212 B2 | 8/2007 | Kawabe |
| 7,263,213 B2 | 8/2007 | Rowe |
| 7,289,649 B1 | 10/2007 | Walley et al. |
| 7,290,323 B2 | 11/2007 | Deconde et al. |
| 7,308,121 B2 | 12/2007 | Mathiassen et al. |
| 7,308,122 B2 | 12/2007 | McClurg et al. |
| 7,321,672 B2 | 1/2008 | Sasaki et al. |
| 7,356,169 B2 | 4/2008 | Hamid |
| 7,360,688 B1 | 4/2008 | Harris |
| 7,369,685 B2 | 5/2008 | DeLeon |
| 7,379,569 B2 | 5/2008 | Chikazawa et al. |
| 7,408,135 B2 | 8/2008 | Fujeda |
| 7,409,876 B2 | 8/2008 | Ganapathi et al. |
| 7,412,083 B2 | 8/2008 | Takahashi |
| 7,424,618 B2 | 9/2008 | Roy et al. |
| 7,447,339 B2 | 11/2008 | Mimura et al. |
| 7,447,911 B2 | 11/2008 | Chou et al. |
| 7,460,109 B2 | 12/2008 | Safai et al. |
| 7,460,697 B2 | 12/2008 | Erhart et al. |
| 7,463,756 B2 | 12/2008 | Benkley |
| 7,474,772 B2 | 1/2009 | Russo et al. |
| 7,505,611 B2 | 3/2009 | Fyke |
| 7,505,613 B2 | 3/2009 | Russo |
| 7,565,548 B2 | 7/2009 | Fiske et al. |
| 7,574,022 B2 | 8/2009 | Russo |
| 7,596,832 B2 | 10/2009 | Hsieh et al. |
| 7,599,530 B2 | 10/2009 | Boshra |
| 7,616,787 B2 | 11/2009 | Boshra |
| 7,634,117 B2 | 12/2009 | Cho |
| 7,643,950 B1 | 1/2010 | Getzin et al. |
| 7,646,897 B2 | 1/2010 | Fyke |
| 7,681,232 B2 | 3/2010 | Nordentoft et al. |
| 7,689,013 B2 | 3/2010 | Shinzaki |
| 7,706,581 B2 | 4/2010 | Drews et al. |
| 7,733,697 B2 | 6/2010 | Picca et al. |
| 7,734,074 B2 | 6/2010 | Setlak et al. |
| 7,751,601 B2 | 7/2010 | Benkley |
| 7,826,645 B1 | 11/2010 | Cayen |
| 7,831,070 B1 | 11/2010 | Cheng et al. |
| 7,843,438 B2 | 11/2010 | Onoda |
| 7,848,798 B2 | 12/2010 | Martinsen et al. |
| 7,899,216 B2 | 3/2011 | Watanabe et al. |
| 8,538,097 B2 | 9/2013 | Russo |
| 2001/0026636 A1 | 10/2001 | Mainget |
| 2001/0030644 A1 | 10/2001 | Allport |
| 2001/0036299 A1 | 11/2001 | Senior |
| 2001/0043728 A1 | 11/2001 | Kramer et al. |
| 2002/0025062 A1 | 2/2002 | Black |
| 2003/0014530 A1 | 2/2002 | Iihma |
| 2002/0061125 A1 | 5/2002 | Fujii |
| 2002/0064892 A1 | 5/2002 | Lepert et al. |
| 2002/0067845 A1 | 6/2002 | Griffis |
| 2002/0073046 A1 | 6/2002 | David |
| 2002/0089044 A1 | 7/2002 | Simmons et al. |
| 2002/0089410 A1 | 7/2002 | Janiak et al. |
| 2002/0096731 A1 | 7/2002 | Wu et al. |
| 2002/0122026 A1 | 9/2002 | Bergstrom |
| 2002/0126516 A1 | 9/2002 | Jeon |
| 2002/0133725 A1 | 9/2002 | Roy et al. |
| 2002/0152048 A1 | 10/2002 | Hayes |
| 2002/0181749 A1 | 12/2002 | Matsumoto et al. |
| 2003/0002717 A1 | 1/2003 | Hamid |
| 2003/0002719 A1 | 1/2003 | Hamid et al. |
| 2003/0021495 A1 | 1/2003 | Cheng |
| 2003/0035570 A1 | 2/2003 | Benkley |
| 2003/0063782 A1 | 4/2003 | Acharya et al. |
| 2003/0068072 A1 | 4/2003 | Hamid |
| 2003/0076301 A1 | 4/2003 | Tsuk et al. |
| 2003/0076303 A1 | 4/2003 | Huppi |
| 2003/0095096 A1 | 5/2003 | Robbin et al. |
| 2003/0095690 A1 | 5/2003 | Su et al. |
| 2003/0102874 A1 | 6/2003 | Lane et al. |
| 2003/0123714 A1 | 7/2003 | O'Gorman et al. |
| 2003/0123715 A1 | 7/2003 | Uchida |
| 2003/0141959 A1 | 7/2003 | Keogh et al. |
| 2003/0147015 A1 | 8/2003 | Katoh et al. |
| 2003/0161510 A1 | 8/2003 | Fujii |
| 2003/0161512 A1 | 8/2003 | Mathiassen |
| 2003/0169228 A1 | 9/2003 | Mathiassen et al. |
| 2003/0174871 A1 | 9/2003 | Yoshioka et al. |
| 2003/0186157 A1 | 10/2003 | Teraoka et al. |
| 2003/0209293 A1 | 11/2003 | Sako et al. |
| 2003/0224553 A1 | 12/2003 | Manansala |
| 2004/0012773 A1 | 1/2004 | Puttkammer |
| 2004/0017934 A1 | 1/2004 | Kocher |
| 2004/0021786 A1 | 2/2004 | Nakamura et al. |
| 2004/0022001 A1 | 2/2004 | Chu et al. |
| 2004/0042642 A1 | 3/2004 | Bolle et al. |
| 2004/0050930 A1 | 3/2004 | Rowe |
| 2004/0066613 A1 | 4/2004 | Leitao |
| 2004/0076313 A1 | 4/2004 | Bronstein et al. |
| 2004/0081339 A1 | 4/2004 | Benkley |
| 2004/0096086 A1 | 5/2004 | Miyasaka |
| 2004/0113956 A1 | 6/2004 | Bellwood et al. |
| 2004/0120400 A1 | 6/2004 | Linzer |
| 2004/0125993 A1 | 7/2004 | Zhao et al. |
| 2004/0129787 A1 | 7/2004 | Saito |
| 2004/0136612 A1 | 7/2004 | Meister et al. |
| 2004/0155752 A1 | 8/2004 | Radke |
| 2004/0172339 A1 | 9/2004 | Snelgrove et al. |
| 2004/0179718 A1 | 9/2004 | Chou |
| 2004/0184641 A1 | 9/2004 | Nagasaka et al. |
| 2004/0188838 A1 | 9/2004 | Okada et al. |
| 2004/0190761 A1 | 9/2004 | Lee |
| 2004/0208346 A1 | 10/2004 | Baharav et al. |
| 2004/0208347 A1 | 10/2004 | Baharav et al. |
| 2004/0208348 A1 | 10/2004 | Baharav et al. |
| 2004/0213441 A1 | 10/2004 | Tschudi |
| 2004/0215689 A1 | 10/2004 | Dooley et al. |
| 2004/0228505 A1 | 11/2004 | Sugimoto |
| 2004/0228508 A1 | 11/2004 | Shigeta |
| 2004/0240712 A1 | 12/2004 | Rowe et al. |
| 2004/0252867 A1 | 12/2004 | Lan et al. |
| 2005/0031174 A1 | 2/2005 | Ryhanen et al. |
| 2005/0036665 A1 | 2/2005 | Higuchi |
| 2005/0047485 A1 | 3/2005 | Khayrallah et al. |
| 2005/0100196 A1 | 5/2005 | Scott et al. |
| 2005/0100938 A1 | 5/2005 | Hoffmann et al. |
| 2005/0103611 A1 | 5/2005 | Holscher |
| 2005/0109835 A1 | 5/2005 | Jacoby et al. |
| 2005/0110103 A1 | 5/2005 | Setlak |
| 2005/0111708 A1 | 5/2005 | Chou |
| 2005/0123176 A1 | 6/2005 | Ishii et al. |
| 2005/0129291 A1 | 6/2005 | Boshra |
| 2005/0136200 A1 | 6/2005 | Durell et al. |
| 2005/0139656 A1 | 6/2005 | Arnouse |
| 2005/0139685 A1 | 6/2005 | Kozlay |
| 2005/0162402 A1 | 7/2005 | Watanachote |
| 2005/0169503 A1 | 8/2005 | Howell et al. |
| 2005/0174015 A1 | 8/2005 | Scott et al. |
| 2005/0179657 A1 | 8/2005 | Russo et al. |
| 2005/0210271 A1 | 9/2005 | Chou et al. |
| 2005/0219200 A1 | 10/2005 | Weng |
| 2005/0220329 A1 | 10/2005 | Payne et al. |
| 2005/0231213 A1 | 10/2005 | Chou et al. |
| 2005/0238212 A1 | 10/2005 | Du et al. |
| 2005/0244038 A1 | 11/2005 | Benkley |
| 2005/0244039 A1 | 11/2005 | Geoffroy et al. |
| 2005/0247559 A1 | 11/2005 | Frey et al. |
| 2005/0249386 A1 | 11/2005 | Juh |
| 2005/0258952 A1 | 11/2005 | Utter et al. |
| 2005/0269402 A1 | 12/2005 | Spitzer et al. |
| 2006/0006224 A1 | 1/2006 | Modi |
| 2006/0055500 A1 | 3/2006 | Burke et al. |
| 2006/0057756 A1 | 3/2006 | Sato et al. |
| 2006/0066572 A1 | 3/2006 | Yumoto et al. |
| 2006/0078176 A1 | 4/2006 | Abiko et al. |
| 2006/0083411 A1 | 4/2006 | Benkley |
| 2006/0110537 A1 | 5/2006 | Huang et al. |
| 2006/0140461 A1 | 6/2006 | Kim et al. |
| 2006/0144953 A1 | 7/2006 | Takao |
| 2006/0170528 A1 | 8/2006 | Fukushige et al. |
| 2006/0181521 A1 | 8/2006 | Perrault et al. |
| 2006/0182319 A1 | 8/2006 | Setlank et al. |

(56) References Cited

U.S. PATENT DOCUMENTS

| | | |
|---|---|---|
| 2006/0187200 A1 | 8/2006 | Martin |
| 2006/0210082 A1 | 9/2006 | Devadas et al. |
| 2006/0214512 A1 | 9/2006 | Iwata |
| 2006/0214767 A1 | 9/2006 | Carrieri |
| 2006/0239514 A1 | 10/2006 | Watanabe et al. |
| 2006/0249008 A1 | 11/2006 | Luther |
| 2006/0259873 A1 | 11/2006 | Mister |
| 2006/0261174 A1 | 11/2006 | Zellner et al. |
| 2006/0267125 A1 | 11/2006 | Huang et al. |
| 2006/0267385 A1 | 11/2006 | Steenwyk et al. |
| 2006/0271793 A1 | 11/2006 | Devadas et al. |
| 2006/0285728 A1 | 12/2006 | Leung et al. |
| 2006/0287963 A1 | 12/2006 | Steeves et al. |
| 2007/0031011 A1 | 2/2007 | Erhart et al. |
| 2007/0036400 A1 | 2/2007 | Watanabe et al. |
| 2007/0057763 A1 | 3/2007 | Blattner et al. |
| 2007/0058843 A1 | 3/2007 | Theis et al. |
| 2007/0067828 A1 | 3/2007 | Bychkov |
| 2007/0076926 A1 | 4/2007 | Schneider et al. |
| 2007/0076951 A1 | 4/2007 | Tanaka et al. |
| 2007/0086634 A1 | 4/2007 | Setlak et al. |
| 2007/0090312 A1 | 4/2007 | Stallinga et al. |
| 2007/0138299 A1 | 6/2007 | Mitra |
| 2007/0154072 A1 | 7/2007 | Taraba et al. |
| 2007/0160269 A1 | 7/2007 | Kuo |
| 2007/0180261 A1 | 8/2007 | Akkermans et al. |
| 2007/0196002 A1 | 8/2007 | Choi et al. |
| 2007/0198141 A1 | 8/2007 | Moore |
| 2007/0198435 A1 | 8/2007 | Siegal et al. |
| 2007/0228154 A1 | 10/2007 | Tran |
| 2007/0237366 A1 | 10/2007 | Maletsky |
| 2007/0237368 A1 | 10/2007 | Bjorn et al. |
| 2007/0248249 A1 | 10/2007 | Stoianov |
| 2007/0290124 A1 | 12/2007 | Neil et al. |
| 2008/0002867 A1 | 1/2008 | Mathiassen et al. |
| 2008/0013805 A1 | 1/2008 | Sengupta et al. |
| 2008/0019578 A1 | 1/2008 | Saito et al. |
| 2008/0049987 A1 | 2/2008 | Champagne et al. |
| 2008/0049989 A1 | 2/2008 | Iseri et al. |
| 2008/0063245 A1 | 3/2008 | Benkley et al. |
| 2008/0069412 A1 | 3/2008 | Champagne et al. |
| 2008/0126260 A1 | 5/2008 | Cox et al. |
| 2008/0169345 A1 | 7/2008 | Keane et al. |
| 2008/0170695 A1 | 7/2008 | Adler et al. |
| 2008/0175450 A1 | 7/2008 | Scott |
| 2008/0178008 A1 | 7/2008 | Takahashi et al. |
| 2008/0179112 A1 | 7/2008 | Qin et al. |
| 2008/0185429 A1 | 8/2008 | Saville |
| 2008/0201265 A1 | 8/2008 | Hewton |
| 2008/0205714 A1 | 8/2008 | Benkley et al. |
| 2008/0219521 A1 | 9/2008 | Benkley et al. |
| 2008/0222049 A1 | 9/2008 | Loomis et al. |
| 2008/0223925 A1 | 9/2008 | Saito et al. |
| 2008/0226132 A1 | 9/2008 | Gardner |
| 2008/0238878 A1 | 10/2008 | Wang |
| 2008/0240523 A1 | 10/2008 | Benkley et al. |
| 2008/0240537 A1 | 10/2008 | Yang et al. |
| 2008/0244277 A1 | 10/2008 | Orsini et al. |
| 2008/0267462 A1 | 10/2008 | Nelson et al. |
| 2008/0279373 A1 | 11/2008 | Erhart et al. |
| 2008/0317290 A1 | 12/2008 | Tazoe |
| 2009/0001999 A1 | 1/2009 | Douglas |
| 2009/0130369 A1 | 5/2009 | Huang et al. |
| 2009/0140838 A1 | 6/2009 | Newman et al. |
| 2009/0153297 A1 | 6/2009 | Gardner |
| 2009/0154779 A1 | 6/2009 | Satyan et al. |
| 2009/0155456 A1 | 6/2009 | Benkley et al. |
| 2009/0169071 A1 | 7/2009 | Bond et al. |
| 2009/0174974 A1 | 7/2009 | Huang et al. |
| 2009/0212902 A1 | 8/2009 | Haddock |
| 2009/0218698 A1 | 9/2009 | Lam |
| 2009/0237135 A1 | 9/2009 | Ramaraju et al. |
| 2009/0252384 A1 | 10/2009 | Dean et al. |
| 2009/0252385 A1 | 10/2009 | Dean et al. |
| 2009/0252386 A1 | 10/2009 | Dean et al. |
| 2009/0279742 A1 | 11/2009 | Abiko |
| 2009/0319435 A1 | 12/2009 | Little et al. |
| 2009/0324028 A1 | 12/2009 | Russo |
| 2010/0026451 A1 | 2/2010 | Erhart et al. |
| 2010/0045705 A1 | 2/2010 | Vertegaal et al. |
| 2010/0083000 A1 | 4/2010 | Kesanupalli et al. |
| 2010/0117794 A1 | 5/2010 | Adams et al. |
| 2010/0119124 A1 | 5/2010 | Satyan |
| 2010/0123675 A1 | 5/2010 | Ippel |
| 2010/0127366 A1 | 5/2010 | Bond et al. |
| 2010/0176823 A1 | 7/2010 | Thompson et al. |
| 2010/0176892 A1 | 7/2010 | Thompson et al. |
| 2010/0177940 A1 | 7/2010 | Thompson et al. |
| 2010/0180136 A1 | 7/2010 | Thompson et al. |
| 2010/0189314 A1 | 7/2010 | Benkley et al. |
| 2010/0208953 A1 | 8/2010 | Gardner et al. |
| 2010/0244166 A1 | 9/2010 | Shibuta et al. |
| 2010/0272329 A1 | 10/2010 | Benkley |
| 2010/0284565 A1 | 11/2010 | Benkley et al. |
| 2011/0002461 A1 | 1/2011 | Erhart et al. |

FOREIGN PATENT DOCUMENTS

| | | |
|---|---|---|
| EP | 0791899 A3 | 8/1997 |
| EP | 0791899 B1 | 8/1997 |
| EP | 0929028 A2 | 1/1998 |
| EP | 0905646 A1 | 3/1999 |
| EP | 0973123 A1 | 1/2000 |
| EP | 1018697 A2 | 7/2000 |
| EP | 1139301 A2 | 10/2001 |
| EP | 1531419 A2 | 5/2005 |
| EP | 1533759 A1 | 5/2005 |
| EP | 1536368 A1 | 6/2005 |
| EP | 1538548 A2 | 6/2005 |
| EP | 1624399 B1 | 2/2006 |
| EP | 1775674 A1 | 4/2007 |
| EP | 1939788 A1 | 7/2008 |
| GB | 2331613 A | 5/1999 |
| GB | 2480919 | 12/2011 |
| GB | 2487661 A1 | 8/2012 |
| GB | 2489100 A | 9/2012 |
| GB | 2490192 | 10/2012 |
| GB | 2474999 B | 2/2013 |
| GB | 2499497 | 8/2013 |
| JP | 01094418 A2 | 4/1989 |
| JP | 04158434 A2 | 6/1992 |
| JP | 2003256820 A | 9/2003 |
| JP | 2005011002 A | 1/2005 |
| JP | 2005242856 | 9/2005 |
| JP | 2006053768 | 6/2006 |
| JP | 2007305097 A | 11/2007 |
| JP | 3569804 B2 | 9/2009 |
| KR | 20060134614 A | 12/2007 |
| TW | 200606745 A | 2/2006 |
| TW | 200606746 | 2/2006 |
| TW | 200614092 | 5/2006 |
| TW | 200617798 | 6/2006 |
| TW | 200620140 A | 6/2006 |
| TW | 200629167 A | 8/2006 |
| WO | WO 90/03620 A1 | 4/1990 |
| WO | WO 98/58342 A1 | 12/1998 |
| WO | WO 99/28701 A1 | 6/1999 |
| WO | WO 99/43258 A1 | 9/1999 |
| WO | WO 99/46724 A1 | 9/1999 |
| WO | WO 01/22349 A1 | 3/2001 |
| WO | WO 01/59558 A1 | 8/2001 |
| WO | WO 01/94902 A2 | 12/2001 |
| WO | WO 01/94902 A3 | 12/2001 |
| WO | WO 01/95304 A1 | 12/2001 |
| WO | WO 02/11066 A1 | 2/2002 |
| WO | WO 02/47018 A2 | 6/2002 |
| WO | WO 02/47018 A3 | 6/2002 |
| WO | WO 02/061668 A1 | 8/2002 |
| WO | WO 02/077907 A1 | 10/2002 |
| WO | WO 03/063054 A2 | 7/2003 |
| WO | WO 03/075210 A2 | 9/2003 |
| WO | WO 2004/066194 A1 | 8/2004 |
| WO | WO 2004/066693 A1 | 8/2004 |
| WO | WO 2005/104012 A1 | 11/2005 |

(56) References Cited

FOREIGN PATENT DOCUMENTS

| WO | WO 2005/106774 A2 | 11/2005 |
|---|---|---|
| WO | WO 2005/106774 A3 | 11/2005 |
| WO | WO 2006/040724 A1 | 4/2006 |
| WO | WO 2006/041780 A1 | 4/2006 |
| WO | WO 2007/011607 A1 | 1/2007 |
| WO | WO 2008/033264 A2 | 3/2008 |
| WO | WO 2008/033264 A3 | 3/2008 |
| WO | WO 2008/033265 A2 | 6/2008 |
| WO | WO 2008/033265 A3 | 6/2008 |
| WO | WO 2008/137287 A1 | 11/2008 |
| WO | WO 2009/002599 A2 | 12/2008 |
| WO | WO 2009/002599 A3 | 12/2008 |
| WO | WO 2009/029257 A1 | 6/2009 |
| WO | WO 2009/079219 A1 | 6/2009 |
| WO | WO 2009/079221 A2 | 6/2009 |
| WO | WO 2009/079262 A1 | 6/2009 |
| WO | WO 2010/034036 A1 | 3/2010 |
| WO | WO 2010/036445 A1 | 4/2010 |
| WO | WO 2010/143597 A1 | 12/2010 |

OTHER PUBLICATIONS

Maltoni, "Handbook of Fingerprint Recognition", XP002355942 Springer, New York, USA, Jun. 2003 pp. 65-69.

Vermasan, et al., "A 500 dpi AC Capacitive Hybrid Flip-Chip CMOS ASIC/Sensor Module for Fingerprint, Navigation, and Pointer Detection With On-Chip Data Processing", IEEE Journal of Solid State Circuits, vol. 38, No. 12, Dec. 2003, pp. 2288-2294.

Ratha, et al. "Adaptive Flow Orientation Based Feature Extraction in Fingerprint Images," Pattern Recognition, vol. 28 No. 11, 1657-1672, Nov. 1995.

Ratha, et al., "A Real Time Matching System for Large Fingerprint Databases," IEEE, Aug. 1996.

Shu, et al., "Design and Implementation of the AEGIS Single-Chip Secure Processor Using Physical Random Functions", Computer Architecture, 2005, ISCA '05, Proceedings, 32nd International Symposium, Jun. 2005 (MIT Technical Report CSAIL CSG-TR-843, 2004.

Rivest, et al., "A Method for Obtaining Digital Signatures and Public-Key Cryptosystems", Communication of the ACM, vol. 21 (2), pp. 120-126. (1978).

Hiltgen, et al., "Secure Internet Banking Authentication", IEEE Security and Privacy, IEEE Computer Society, New York, NY, US, Mar. 1, 2006, pp. 24-31, XP007908655, ISSN: 1540-7993.

Hegt, "Analysis of Current and Future Phishing Attacks on Internet Banking Services", Mater Thesis. Techische Universiteit Eindhoven—Department of Mathematics and Computer Science May 31, 2008, pp. 1-149, XP002630374, Retrieved from the Internet: URL:http://alexandria.tue.nl/extral/afstversl/wsk-i/hgt2008.pdf [retrieved on Mar. 29, 2011] *pp. 127-134, paragraph 6.2*.

Gassend, et al., "Controlled Physical Random Functions", In Proceedings of the 18th Annual Computer Security Conference, Las Vegas, Nevada, Dec. 12, 2002.

Wikipedia (Mar. 2003). "Integrated Circuit," http://en.wikipedia.org/wiki/integrated_circuit. Revision as of Mar. 23, 2003.

Wikipedia (Dec. 2006). "Integrated circuit" Revision as of Dec. 10, 2006. http://en.widipedia.org/wiki/Integrated_circuit.

Bellagiodesigns.com (Internet Archive Wayback Machine, www.bellagiodesigns.com date: Oct. 29, 2005).

Closed Loop Systems, The Free Dictionary, http://www.thefreedictionary.com/closed-loop+system (downloaded Dec. 1, 2011).

Feedback: Electronic Engineering, Wikipedia, p. 5 http://en.wikipedia.org/wiki/Feedback#Electronic_engineering (downloaded Dec. 1, 2011).

Galy et al. (Jul. 2007) "A full fingerprint verification system for a single-line sweep sensor." IEEE Sensors J., vol. 7 No. 7, pp. 1054-1065.

SYSTEM AND METHOD OF IMAGE RECONSTRUCTION WITH DUAL LINE SCANNER USING LINE COUNTS

CROSS-REFERENCE

This application is a continuation application of Ser. No. 13/014,389, filed Jan. 26, 2011, which is incorporated herein by reference in its entirety and to which application we claim priority under 35 USC §120.

BACKGROUND OF THE INVENTION

Some conventional fingerprint scanners include large, wall-mounted units, called contact or placement sensors, that sense an entire fingerprint at once (e.g., an entire fingerprint including images of 200-500 rows and 128-200 columns of pixels). Other fingerprint scanners include smaller swipe scanners incorporated into laptop and notebook computers, mobile phones, mobile email devices, and smart phones. Smaller swipe scanners are much less expensive to manufacture than larger contact or placement scanners. Stationary swipe fingerprint scanners sense a finger being swiping across the scanner and can be dual line scanners or multi line scanners.

One example of a dual line scanner is disclosed in U.S. Pat. No. 6,002,815 issued to Immega et al. on Dec. 14, 1999 ("Immega"), the entire contents of which is herein incorporated by reference. The Immega dual line scanner must determine and track the velocity of the finger as it passes over the sensor and a 1×n pixel array scanner. The Immega dual line scanner performs 1×n linear array cross-correlation on current and historic line scans to initially image the fingerprint. The velocity of the finger must then be known in order to reconstruct the fingerprint image from the line scans.

One example of a multi-line scanner is disclosed in U.S. Pat. No. 7,197,168, issued to Russo on Mar. 27, 2007 ("Russo"), the entire contents of which is herein incorporated by reference. The Russo multi line scanner reassembles overlapping object imaging frame scans collected by a multi-line sensor array to reconstruct the fingerprint image without calculating the velocity of the finger.

SUMMARY OF THE INVENTION

Determining and tracking the velocity of the finger as it moves over the scanner is cumbersome and require additional system complexity to address special cases such as stiction, dropped lines and line culling. Thus, there is a need for a dual line scanner for imaging a fingerprint that does not require velocity to be determined.

Some embodiments of the present disclosure provide a fingerprint scanning and image reconstruction system and method to create fingerprint images without relying on velocity. The system can include a fingerprint scanner providing a first scan line and a second scan line separated by a line separation distance in a scanning direction. The system can include an image reconstruction module receiving and accumulating scan lines including at least the first scan line and the second scan line over a time period t. The image reconstruction module determines a reconstructed image resolution in the scanning direction based at least in part on [line separation distance divided by line count(t)] multiplied by decimation (t), where line count(t) is the number of lines accumulated as a function of the time period t, and decimation(t) is a ratio indicative of whether the line count(t) is greater than or less than the number of lines accumulated as a function of the time period t that will result in a selected reconstructed image resolution in the scanning direction.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Before any embodiments of the invention are explained in detail, it is to be understood that the present disclosure is not limited in its application to the details of construction and the arrangement of components set forth in the following description or illustrated in the described drawings. The present disclosure is capable of other embodiments and of being practiced or of being carried out in various ways. Also, it is to be understood that the phraseology and terminology used in this application is for the purpose of description and should not be regarded as limiting. The use of "including," "comprising," or "having" is meant to encompass the items listed thereafter and equivalents, as well as additional items. Unless specified or limited otherwise, the terms used are intended to cover variations ordinarily known, now or in the future. Further, "connected" and "coupled" are not restricted to physical or mechanical connections or couplings and can include both physical and electrical, magnetic, and capacitive couplings and connections.

The following discussion is presented to enable a person skilled in the art to make and use embodiments of the present disclosure. The following detailed description is to be read with reference to the figures, in which like elements in different figures have like reference numerals. The figures depict selected embodiments and are not intended to limit the scope of embodiments of the present disclosure.

Figure 1:
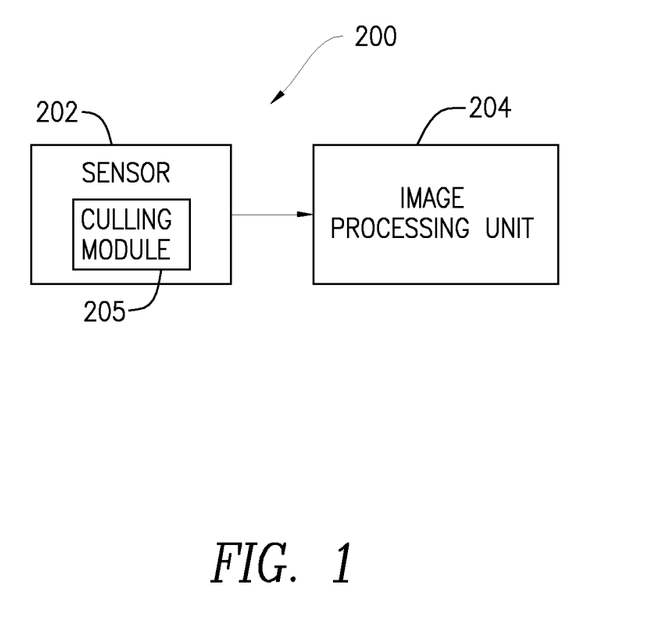
FIG. 1 is a schematic block diagram of a basic configuration for a fingerprint scanning and image reconstruction system according to embodiments of the present disclosure.
Figure 2:
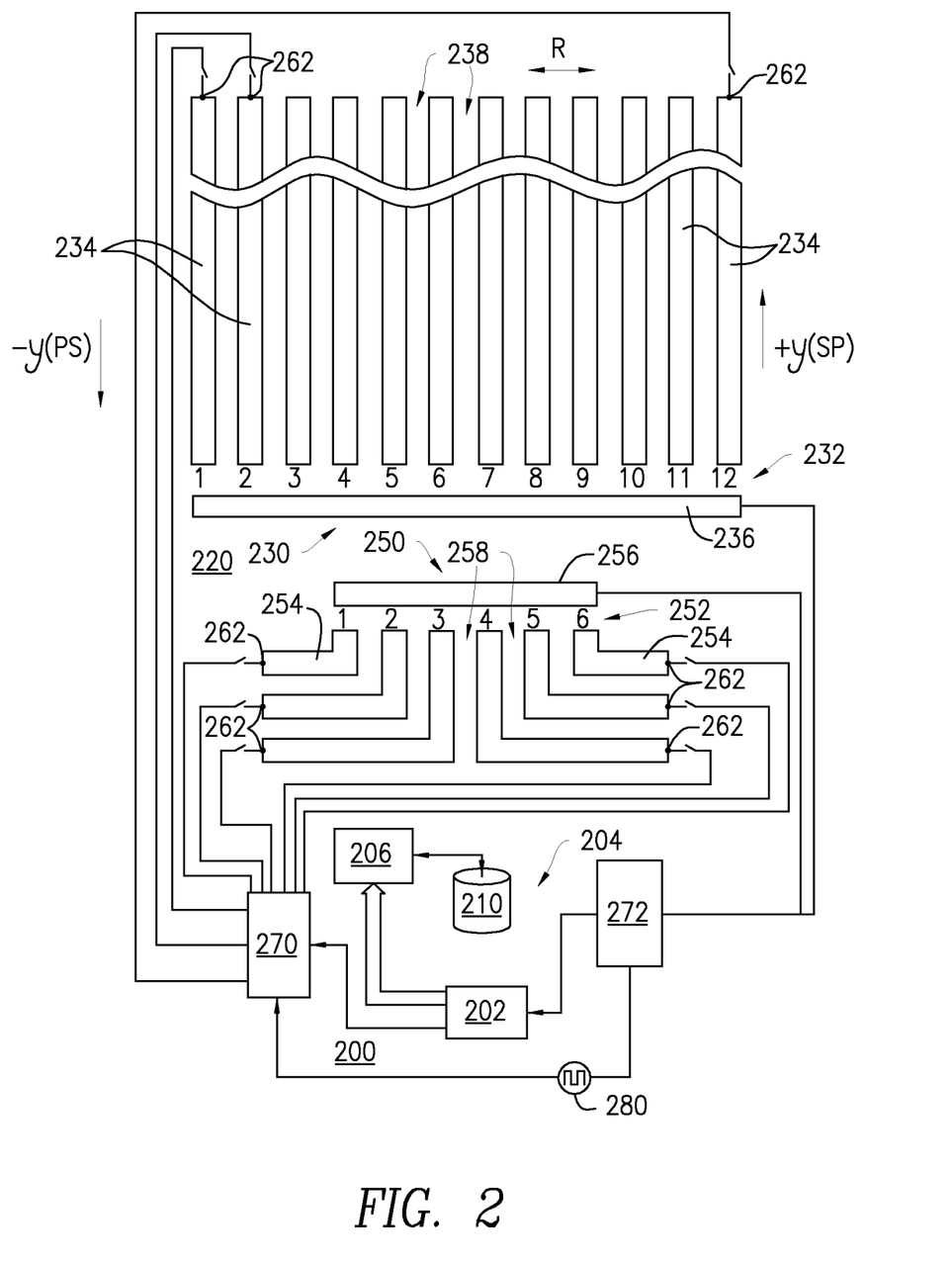
FIG. 2 is a schematic view, partly in block diagram form, of a dual line fingerprint scanner according to one embodiment of the present disclosure.

FIG. 1 schematically illustrates a fingerprint scanning and image reconstruction system 200 according to embodiments of the present disclosure. The fingerprint scanning and image reconstruction system 200 includes a sensor 202 and an image reconstruction module 204. The image reconstruction module 204 can be connected to or integrated with a host computing device 206 (as shown in FIG. 2) and can receive inputs from the sensor 202. The host computing device 206 can be connected to a database 210. In some embodiments, the sensor 202 can also include a culling module 205 to reduce the amount of data transmitted over the bandwidth of the communication links, whether wired or wireless, between the sensor 202, the image reconstruction module 204, and the host computing device 206. Culling is a technique for keeping line scans with very little variation from one clock time to the next clock time from being sent to the image reconstruction module 204 and/or the host computing device 206. If there is no change from one clock time to the next clock time, the finger is not moving with respect to the sensor 202. It is well understood in the art that such essentially redundant scan lines are not useful in image reconstruction. Note that the image reconstruction system 200 may be implemented across multiple discrete devices or on a single piece of silicon.

FIG. 2 schematically illustrates a dual line fingerprint scanner 220 according to one embodiment of the present disclosure. The dual line scanner 220 includes a primary linear scanner segment 230 and a secondary linear scanner segment 250. The primary linear scanner segment 230 can be a 1×n linear pixel array, where n is typically 128-200 pixel scan points (for illustrative purposes, only 12 pixel scan points 232 are shown in FIG. 2). The secondary linear scanner segment 250 can be a 1×n linear pixel array, where n is about half of the number of pixels in the primary linear scanner segment 230 (e.g., about 64-100 pixel scan points 252, but with only 6 pixel scan points 252 being shown in FIG. 2). The secondary linear segment 250 need not be centered with respect to the primary segment 230, but in fact may span any physical subset of the primary segment 230.

Drive signals are supplied to each pixel scan point 232, 252 through leads 234, 254 across from reference voltage plates 236, 256 using a multiplexer 270, connected to the leads 234, 254 through contacts 262. The responses to the drive signals are influenced by capacitive couplings between the leads 234, 254 and the voltage plates 236, 256 at the pixel scan points 232, 252 as sensed by sensors 272. The capacitive couplings are influenced by whether the portion of the fingerprint being scanned at the pixel scan points 232, 252 is a ridge or a valley of the fingerprint. The output of each pixel scan point 232, 252 is a gray scale value from zero to 255. This is a convenient byte size data value range that is exemplary only and can be other values of gray scale granularity, such as using 4 bits instead of 8 bits per pixel. Typically, the gray scale value of zero is white and the gray scale value of 255 is black, with intervening incremental shades of gray between these values. The image reconstruction module 204 can perform image reconstruction using these scan lines and the gray scale values to reconstruct the fingerprint with dark indicating ridges and light indicating valleys.

The goal of image reconstruction with a single line scanner or the dual line scanner 220 is to create a fingerprint image with fixed resolution in the y direction. The value of n in the primary linear scanner segment 230 (e.g., n=128) determines the resolution in the x direction. With currently existing systems having 128-200 pixels in the x direction, the leads 234, 254 are typically 25 μm in width with spaces 238, 258 between the leads 234, 254 being 25 μm. Therefore, x-resolution, determined by the distance between the centers of leads 234, is 50 um typically (which gives us 508 dpi). This distance "R" is shown in FIG. 2 for both the primary linear scanner section 230 and the secondary liner scanner section 250. For illustration purposes, +y is chosen to be in the direction the finger moves across the secondary linear scan segment 250 first and then over the primary linear scan segment 230, i.e., SP as shown in FIG. 2, and −y is chosen to be in the direction the finger moves over the primary linear scan segment 230 first and then over the secondary linear scan segment 250, i.e., PS (up as shown in the arrangement of FIG. 2).

Typically y-resolution is chosen to equal x-resolution, but y-resolution may be chosen arbitrarily depending on other system attributes.

For illustration purposes, the y resolution in a reconstructed image can be measured in unit distance/row (e.g., μg/row=μm/sample). In other words, at the given clock speed for the pixels 232, 252, a row is substantially equivalent to a sample taken at each sample time, dictated by the clocking of the sampling scanners (i.e., the pixel scan points 232, 252 in each of the primary linear scanner segment 230 and the secondary linear scanner segment 250). Alternatively, this could be expressed in a more familiar row/unit distance desired in the recreated image to obtain a desired dots per inch (dpi) image resolution in the y direction (e.g., 508 rows/inch=508 samples/inch for a 508 dpi resolution, which corresponds to a scan line separation of 50 μm per sample). Assuming a separation of the primary linear scanner segment 230 from the secondary linear scanner segment 250 of eight rows, this is equal to a 400 μm separation between the scanned image line from the primary linear scanner segment 230 to the secondary linear scanner segment 250 for each sample time.

The mathematical equation for a single or dual line sensor without line culling is the following equation (i):

$$\text{Image } Y\text{-resolution} = [\text{Velocity}(t) * \text{Decimation}(t)] / \text{SensorSampleRate} \quad (i)$$

where time period t is the time it takes for the finger to move from the secondary to the primary (or vice versa), Velocity(t) is the finger velocity during time period t with respect to the primary and secondary linear scanner segments 230, 250; SensorSampleRate is the sensor's fixed scan line rate (i.e., sample timing); and Decimation(t) is the decimation or interpolation ratio required to obtain the desired y-resolution during time period t; it is unitless. A decimation value of 1 means no decimation or interpolation occurs in the image reconstruction (i.e., the object being scanned uniformly passed the primary and secondary linear scanner segments 230, 250 at exactly the velocity needed to obtain the desired y resolution for the desired dpi. A value of greater than 1 implies some scan lines are not used in the reconstructed image (i.e., decimation needs to be done). A value of less than 1 implies some scan lines are added to the reconstructed image (i.e., interpolation needs to be done). In this equation the reconstruction algorithm needs first to estimate the finger velocity over each time period t, after which the decimation rate may then be calculated using the above equation in order to properly resample the scan lines into a fixed-resolution reconstructed image.

Since the sample rate is constant, once velocity is calculated using the dual scan lines, the decimation ratio is trivial to compute. Resolution is in μm/row, velocity is in μm/sec, and sample rate is in rows/sec. Velocity divided by sample rate is in μm/row, since the decimation ratio is unitless. Therefore, the image reconstruction unit 204 simply needs to calculate the correct Decimation(t) and resample the scan line data it receives (i.e., perform decimation or perform interpolation as needed, or perform neither).

With the first equation (i), it can be seen that as the fingerprint being scanned moves more quickly, the decimation ratio must change in an inversely proportional way to velocity to result in a constant output resolution. This is what is used in conventional single and dual line scanners for image reconstruction to determine what is known as "required resampling." However, with line culling, the effective sample rate is a variable (i.e., dependent on time as well). Therefore, the governing second equation (ii) is as follows:

$$\text{Image } Y\text{-resolution}=[\text{Velocity}(t)*\text{Decimation}(t)]/\text{EffectiveSampleRate}(t) \quad \text{(ii)}$$

As the finger velocity changes, the nature of culling is that it is likely to change in a proportional way. For example, as velocity goes down, the effective sample rate also goes down because fewer lines are sent. Stiction, where the finger moves very slowly or stops moving, is an extreme example of this. During stiction, the decimation factor still may change with time (because culling is not perfect), but it is also no longer guaranteed to be inversely proportional to velocity. With conventional image reconstruction methods, it is necessary to modify the timestamps attached to each scan during stiction to remove the long delay between received scan lines due to culling, which allows the proper resampling to occur.

According to embodiments of the present disclosure, resampling is not required if the correct equations are used. As an extreme example, the finger is moving at the natural rate of the sensor, namely 50 μm/sec (i.e., 1 row per sample speed Δt interval), and for simplicity the sensor's sampling rate is 1 row/sec (i.e., one sample every 50 μm). In such a case, the decimation rate is always 1 and the image reconstruction module 204 does not need to perform any resampling (decimation or interpolation).

In another extreme example, consider the finger stopping due to stiction for 1 hour during which time culling correctly does not send any lines to the image reconstruction module 204. In this example, the finger then immediately resumes at the original 50 μm/sec velocity. During the stiction, due to the long delay in movement, the velocity calculation will effectively be zero. Using the first equation (i), one may choose to decimate greatly, which is incorrect. In fact, the correct answer is to do nothing but stack the received scan lines. If the second equation (ii) were being used, the decline in velocity would be offset by the decline in effective sample rate, and the decimation would have remained constant at 1.

According to embodiments of the present disclosure, there is a more effective way to address these issues with image reconstruction as it is currently implemented. Even if using what currently may be determined to be the correct equation, a velocity calculation still appears to be required. However, embodiments of the present disclosure use image reconstruction equations that do not require a velocity calculation. The following is the second equation (ii):

$$\text{Image } Y\text{-resolution}=[\text{Velocity}(t)*\text{Decimation}(t)]/\text{EffectiveSampleRate}(t) \quad \text{(ii)}$$

The second equation (ii) can be refactored as follows into equation (iii):

$$\text{Image } Y\text{-resolution}=[\text{Velocity}(t)/\text{EffectiveSampleRate}(t)]*\text{Decimation}(t) \quad \text{(iii)}$$

The secondary linear scanner segment 250 of the dual line scanner 220 has been used solely to determine velocity, which is why equations (i), (ii), and (iii) also apply to a single line scanner that has some alternate way of calculating instantaneous velocity. When a row previously seen on the secondary linear scanner segment 250 reaches the primary linear scanner segment 230 (i.e., the finger is sweeping across the secondary linear scanner segment 250 first), the velocity calculation is performed as follows according to equation (iv):

$$\text{Velocity}(t)=\text{LineSeparation}/\text{ElapsedTime}(t) \quad \text{(iv)}$$

where LineSeparation is for example 400 μm (i.e., 8 rows) and ElapsedTime(t) is the amount of time it took for the finger to move from the secondary linear scanner segment 250 to the primary linear scanner segment 230 (or vice versa). This relationship would be inversely proportional if the velocity is high enough such that the sensor 202 is undersampled, in which case no culling should occur and EffectiveSampleRate(t) can safely be replaced by SensorSamplingRate. While ElapsedTime(t) may actually be calculated using sensor timestamps, which are really line counts, and multiplying by some fixed SensorSamplingRate, it does not cancel out the EffectiveSampleRate(t) factor in the denominator.

Inserting equation (iv) into the second equation (ii) gives the following equation (v):

$$\text{Image } Y\text{-resolution}=[\text{LineSeparation}/\{\text{ElapsedTime}(t)*\text{EffectiveSampleRate}(t)\}]*\text{Decimation}(t) \quad \text{(v)}$$

However, it can be seen that EffectiveSampleRate(t) is actually the number of rows received by the image reconstruction module 204 divided by the time it took to move from the secondary linear scanner segment 250 to the primary linear scanner segment 230, which equals the ElapsedTime. Thus, ElapsedTime(t)*EffectiveSampleRate(t) is simply the number of rows received by the image reconstruction module 204 in that time. Therefore, the new image reconstruction equation (vi) is as follows:

$$\begin{aligned}\text{Image } Y\text{-resolution} &= [LineSeparation/LineCount(t)] * \\ &\quad \text{Decimation}(t) \text{ or, reorganized, Decimation}(t) \\ &= (\text{Image } Y\text{-resolution} * \text{Line Count}(t))/ \\ &\quad \text{Line Separation}\end{aligned} \quad \text{(vi)}$$

As can be seen, there is no velocity calculation in the new image reconstruction equation (vi). If 8 rows were received by the image reconstruction module 204 in the time it took to move from the secondary linear scanner segment 250 to the primary linear scanner segment 230, and the line separation between the two is 8 rows, the decimation ratio is 1 and no re-sampling needs to be done for image reconstruction. If 16 lines are received, the decimation factor=2 and half of the received lines will be thrown away (i.e., decimated) in order to maintain a constant 508 dpi resolution. If only 4 lines are received, the image reconstruction module 204 must interpolate (i.e., add in) another 4 lines to maintain the required 508 dpi resolution. Using the above equation only decimation rate needs to be calculated; velocity is not needed as it has been substituted by the line count, which is trivial to obtain.

Revisiting the extreme example of the finger stopping for 1 hour in the middle of a swipe due to stiction (the same applies for lesser amounts of stiction, but the extreme amount is illustrative of the effects), no matter how long it takes, the image reconstruction module 204 will receive 8 lines. Due to the assumption that the finger when it is actually moving, moves at 50 μm/sec, the image reconstruction module 204 will receive 8 scan lines from the sensor 202 (again assuming perfect culling). Therefore, the line count is 8 rows, the line separation is 400 μm, and the decimation is 1, in order to maintain 50 μm/row.

According to embodiments of the present disclosure, an improved version of image reconstruction can use the new image reconstruction equation (vi) to perform resampling to match the actual number of scanned lines to the desired number of scanned lines and it will not be necessary to compute instantaneous velocity. Therefore, the improved way of performing image reconstruction is very different from the prior art, which clearly requires the use of velocity for image reconstruction. The software used to implement equation (vi) is more simple and the computing requirements are reduced. Stiction will not need to be accounted for and the use of timestamp modifications is rendered unnecessary. Improved fidelity of the reconstructed image may also prove to be a result in some cases.

Figure 3:
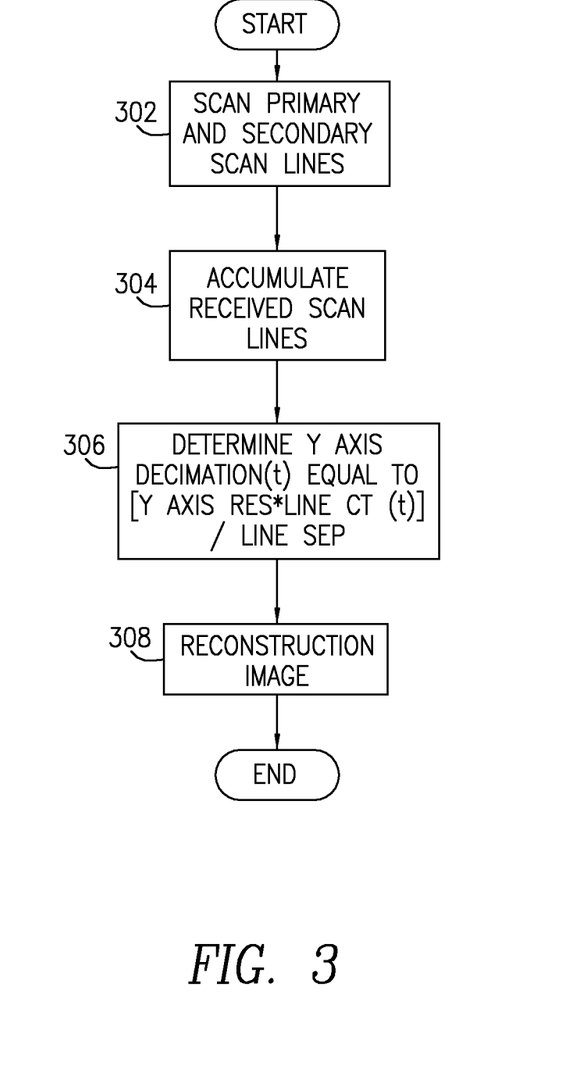
FIG. 3 is a flow diagram for an image reconstruction process according to one embodiment of the present disclosure.

FIG. 3 illustrates an object imaging process according to embodiments of the present disclosure. The sensor 202 can be used (at 302) to scan the primary and secondary scan lines. The image reconstruction module 204 can accumulate (at 304) the scan lines. The image reconstruction module 204 can then determine (at 306) the y-axis resolution from equation (vi), i.e., [line separation/line count (t)]*decimation (t). The image reconstruction unit 204 can then reconstruct (at 308) the image.

Embodiments of the present disclosure can be used to scan objects other than fingers and to create images of such objects other than fingerprint images. The present disclosure can be used to scan other biometric data, such as the palm of a hand or a retina. The present disclosure can also be used to scan virtually any type of object by a swipe scan without having to calculate the velocity of the object as it moves across the swipe scanner.

The present disclosure is described with reference to block diagrams and operational illustrations of methods and devices implementing methods (collectively "block diagrams"). Each block of the block diagram, and combinations of blocks in the block diagram, can be implemented with analog or digital hardware and/or computer program instructions, such as in a computing device. The computer program instructions can be provided to a processor of a general purpose computer, special purpose computer, microcontroller, ASIC, or any other programmable data processing apparatus, so that the instructions implement the functions/acts specified in the block diagram when executed via the computing device. The functions/acts noted in the blocks can occur out of the order noted in the block diagram. For example, two blocks shown in succession can in fact be executed substantially concurrently or the blocks can sometimes be executed in the reverse order, depending upon the functionality/acts involved. In addition, different blocks may be implemented by different computing devices, such as an array of processors within computing devices operating in series or parallel arrangement, and exchanging data and/or sharing common data storage media.

The term "computer readable medium" as used herein and in the claims generally means a non-transitory medium that stores computer programs and/or data in computing device machine-readable form. Computer readable medium can include computer storage media and communication media. Computer storage media can include volatile and non-volatile, removable and non-removable media implemented with any suitable method or technology for the storage of information, such as computer-readable instructions, data structures, program modules, or specific applications.

The term "module" as used herein and in the claims generally means a software, hardware, and/or firmware system, process and/or functionality that can perform or facilitate the processes, features, and/or functions of the present disclosure, with or without human interaction or augmentation. A module can include sub-modules. Software components of a module can be stored on a non-transitory computing device readable medium. Modules can be integral to one or more servers or can be loaded and executed by one or more servers. One or more modules can be grouped into an engine or an application.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method of scanning a biometric object moving in a direction of swiping and reconstructing an image of the biometric object, the method comprising:
    scanning a first scan line utilizing biometric object imager comprising a first linear array of biometric object scanning elements and a second scan line utilizing a second linear array of biometric object scanning elements, the first linear array of biometric object scanning elements and the second linear array of biometric object scanning elements being separated by a scanning line separation distance in the direction of swiping the biometric object, and sampling,
    respectively, at a first scanning time and a second scanning time; and
    reconstructing the biometric object image, based in part on at least one of the scanning line separation distance and a time period between the first scanning time and the second scanning time, without calculating a velocity of the biometric object moving in the scanning direction and reconstructing the biometric object image with a selected reconstructed image resolution in the direction of swiping based at least in part on a determination of whether the number of lines accumulated during the time period between the first scanning time and the second scanning time is greater than or less than the number of lines as a function of the time period between the first scanning time and the second scanning time that will result in the selected reconstructed image resolution in the direction of swiping.

2. The method of claim 1 further comprising:
    accumulating scan lines including at least the first scan line and the second scan line during the period of time period separating the first scanning time and the second scanning time.

3. The method of claim 2 wherein the biometric object is a fingerprint.

4. The method of claim 1 further comprising:
    determining a value for decimation relating to the time period which is necessary to produce a selected y axis resolution in the direction of swiping based at least in part on the number of lines accumulated during the time period divided by the product of the scanning line separation distance between the first linear array of biometric object scanning elements and the second linear array of biometric object scanning elements and the selected y-axis resolution, wherein the decimation for the time period is a ratio indicative of whether the number of lines accumulated during the time period is greater than or less than the number of lines accumulated that will result in the selected y axis resolution in the direction of swiping.

5. The method of claim 1 further comprising:
    receiving the output of the biometric object imager and comparing the first scanned line of biometric object image data to the second scanned line of biometric object image data and culling from the output of the biometric object imager the second scanned line of biometric object image data, when the second scanned line of biometric object image data is effectively redundant as compared to the first scanned line of biometric object image data, and repeating this step with a first un-culled second scanned line as a new first scanned line, to produce a plurality of un-culled second scanned lines of biometric object image data having an effective line scanning rate;

receiving the un-culled second scanned lines of biometric object image data and accumulating the un-culled second scanned lines of biometric object image data over the time period; and determining a value for decimation relating to the time period which is necessary to produce a selected y axis resolution in the direction of swiping based at least in part on the number of un-culled second scanned lines accumulated during the time period divided by the product of line separation distance between the first linear array of biometric object scanning elements and the second linear array of biometric object scanning elements and the selected y-axis resolution, wherein the decimation for the time period is a ratio indicative of whether the number of un-culled second scanned lines of biometric object image data accumulated during the time period is greater than or less than a number of un-culled second scanned lines that will result in the selected y axis resolution in the direction of swiping.

6. The method of claim 1 wherein the biometric object is a fingerprint.

7. A biometric object imaging apparatus comprising:
a biometric object imager configured to scan a biometric object moving in a direction of swiping and reconstruct an image of the biometric object comprising:
a first linear array of biometric object scanning elements and a second linear array of biometric object scanning elements, separated by a scanning line separation distance in the direction of swiping the biometric object, configured to sample scanned lines of biometric object image data at a first scanning time and a second scanning time;
a biometric object image reconstruction apparatus configured to reconstruct the biometric object image, based in part on at least one of the scanning line separation distance and a time period between the first scanning time and the second scanning time, without calculating a velocity of the biometric object moving in the scanning direction and
to reconstruct the biometric object image with a selected reconstructed image resolution in the scanning direction based at least in part on a determination of whether the number of lines accumulated during the time period between the first scanning time and the second scanning time is greater than or less than the number of lines as a function of the time period between the first scanning time and the second scanning time that will result in the selected reconstructed image resolution in the direction of swiping.

8. The apparatus of claim 7 further comprising:
a scan line accumulator configured to accumulate scan lines including at least the first scan line and the second scan line during the time period separating the first scanning time and a second scanning time.

9. The apparatus of claim 8 wherein the biometric object is a fingerprint.

10. The apparatus of claim 7 and further comprising:
a decimation determination apparatus configured to determine a value for decimation during the time period which is necessary to produce a selected y axis resolution in the scanning direction based at least in part on the number of lines accumulated during the time period divided by the product of the line separation distance between the first linear array of biometric object scanning elements and the second linear array of biometric object scanning elements and the selected y-axis resolution, wherein the decimation for the time period is a ratio indicative of whether the number of lines accumulated during the time period is greater than or less than the number of lines accumulated that will result in the selected y axis resolution in the direction of swiping.

11. The apparatus of claim 7 further comprising:
a scanned line culling apparatus configured to:
receive the output of the biometric object imager and compare the first scanned line of biometric object image data to the second scanned line of biometric object image data and cull from the output of the biometric object imager the second scanned line of biometric object image data, when the second scanned line of biometric object image data is effectively redundant as compared to the first scanned line of biometric object image data, and repeating the culling with a first un-culled second scanned line as a new first scanned line, to produce a plurality of un-culled second scanned lines of biometric object image data having an effective line scanning rate;
accumulate the un-culled second scanned lines of biometric object image data over the time period; and
determine a value for decimation relating to the time period which is necessary to produce a selected y axis resolution in the direction of swiping based at least in part on the number of un-culled second scanned lines accumulated during the time period divided by the product of the line separation distance between the first linear array of biometric object scanning elements and the second linear array of biometric object scanning elements and the selected y-axis resolution, wherein the decimation for the time period is a ratio indicative of whether the number of un-culled second scanned lines of biometric object image data accumulated during the time period is greater than or less than a number of un-culled second scanned lines that will result in the selected y axis resolution in the direction of swiping.

12. The apparatus of claim 7 wherein the biometric object is a fingerprint.

13. A non-transitory machine readable medium storing instructions which, when executed by a computing device, cause the computing device to perform a method, the method comprising:
scanning a first scan line utilizing a first linear array of biometric object scanning elements and a second scan line utilizing a second linear array of biometric object scanning elements, the first linear array of biometric object scanning elements and the second linear array of biometric scanning elements being separated by a scanning line separation distance in a direction of swiping the biometric object and sampled, respectively, at a first scanning time and a second scanning time;
reconstructing the biometric object image, based in part on at least one of the scanning line separation distance and a time period between the first scanning time and the second scanning time, without calculating a velocity of the biometric object moving in the direction of swiping and reconstructing the biometric object image with a selected reconstructed image resolution in the direction of swiping based at least in part on a determination of whether the number of lines accumulated during the time period between the first scanning time and the second scanning time is greater than or less than the number of lines as a function of the time period between the first scanning time and the second scanning time that will result in the selected reconstructed image resolution in the direction of swiping.

14. The machine readable medium of claim 13 the method further comprising:

accumulating scan lines including at least the first scan line and the second scan line during the time period separating the first scanning time and the second scanning time.

15. The machine readable medium of claim 13 the method further comprising:

determining a value for decimation relating to the time period which is necessary to produce a selected y axis resolution in the direction of scanning based at least in part on the number of lines accumulated during the time period divided by the product of the line separation distance between the first linear array of biometric object scanning elements and the second linear array of biometric object scanning elements and the selected y-axis resolution, wherein the decimation for the time period is a ratio indicative of whether the number of lines accumulated during the time period is greater than or less than the number of lines accumulated that will result in the selected y axis resolution in the direction of swiping.

16. The machine readable medium of claim 13 the method further comprising:

receiving the output of the biometric object imager and comparing the first scanned line of biometric object image data to the second scanned line of biometric object image data and culling from the output of the biometric object imager the second scanned line of biometric object image data, when the second scanned line of biometric object image data is effectively redundant as compared to the first scanned line of biometric object image data, and repeating the culling with a first un-culled second scanned line as a new first scanned line, to produce a plurality of un-culled second scanned lines of biometric object image data having an effective line scanning rate;

receiving the un-culled second scanned lines of biometric object image data and accumulating the un-culled second scanned lines of biometric object image data over a time period; and determining a value for decimation relating to the time period which is necessary to produce a selected y axis resolution in the scanning direction based at least in part on the number of un-culled second scanned lines accumulated during the time period divided by the product of a line separation distance between first line scanner and the second line scanner and the selected y-axis resolution, wherein the decimation for the time period is a ratio indicative of whether the number of un-culled second scanned lines of biometric object image data accumulated during the time period is greater than or less than a number of un-culled second scanned lines that will result in the selected y axis resolution in the direction of swiping.

17. The machine readable medium of claim 13 wherein the biometric object is a fingerprint.

* * * * *